Figure 1:
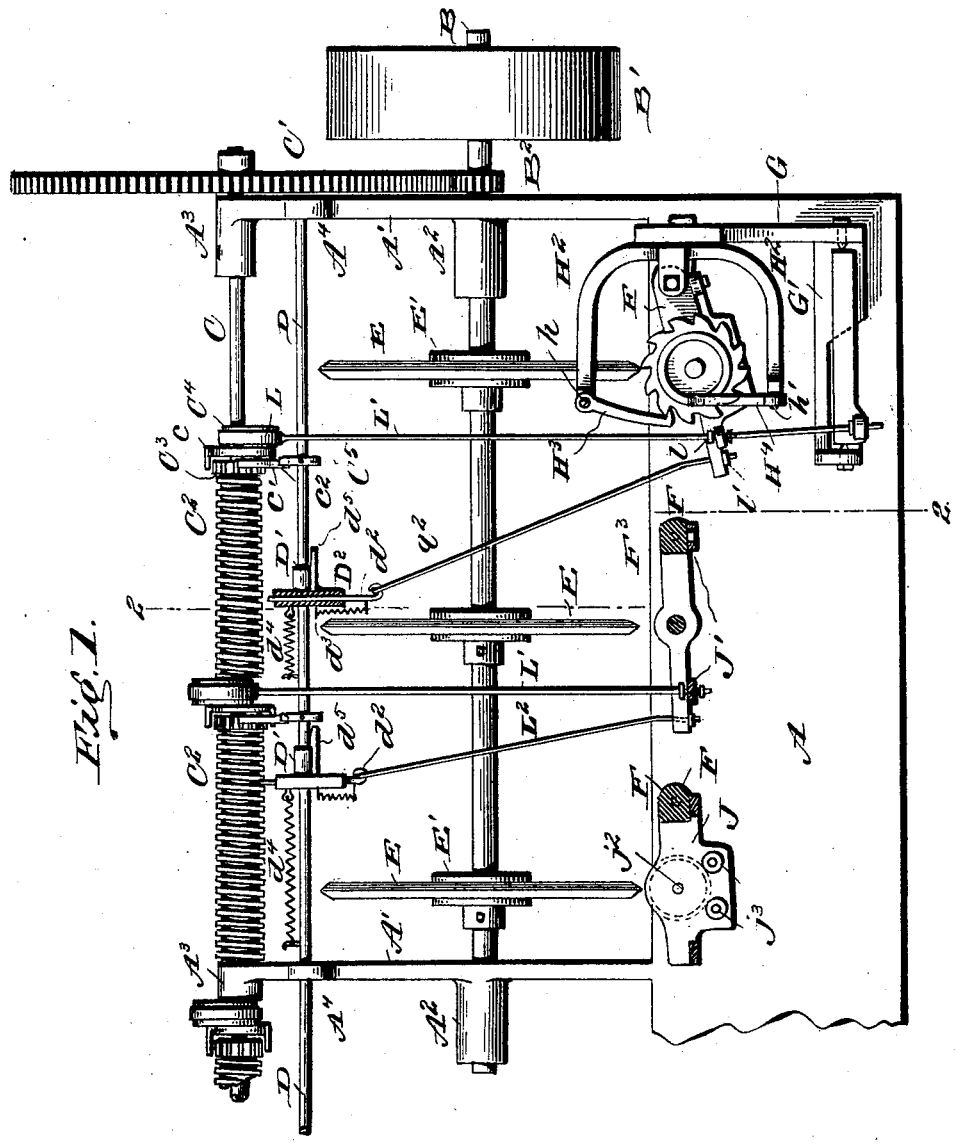

(No Model.)  3 Sheets—Sheet 1.

H. C. SCHRADER.
GLASS GRINDING MACHINE.

No. 595,974. Patented Dec. 21, 1897.

Witnesses:
L. C. Hills.
Alfred T. Gage.

Inventor:
Henry C. Schrader,
by E. B. Stocking
Attorney

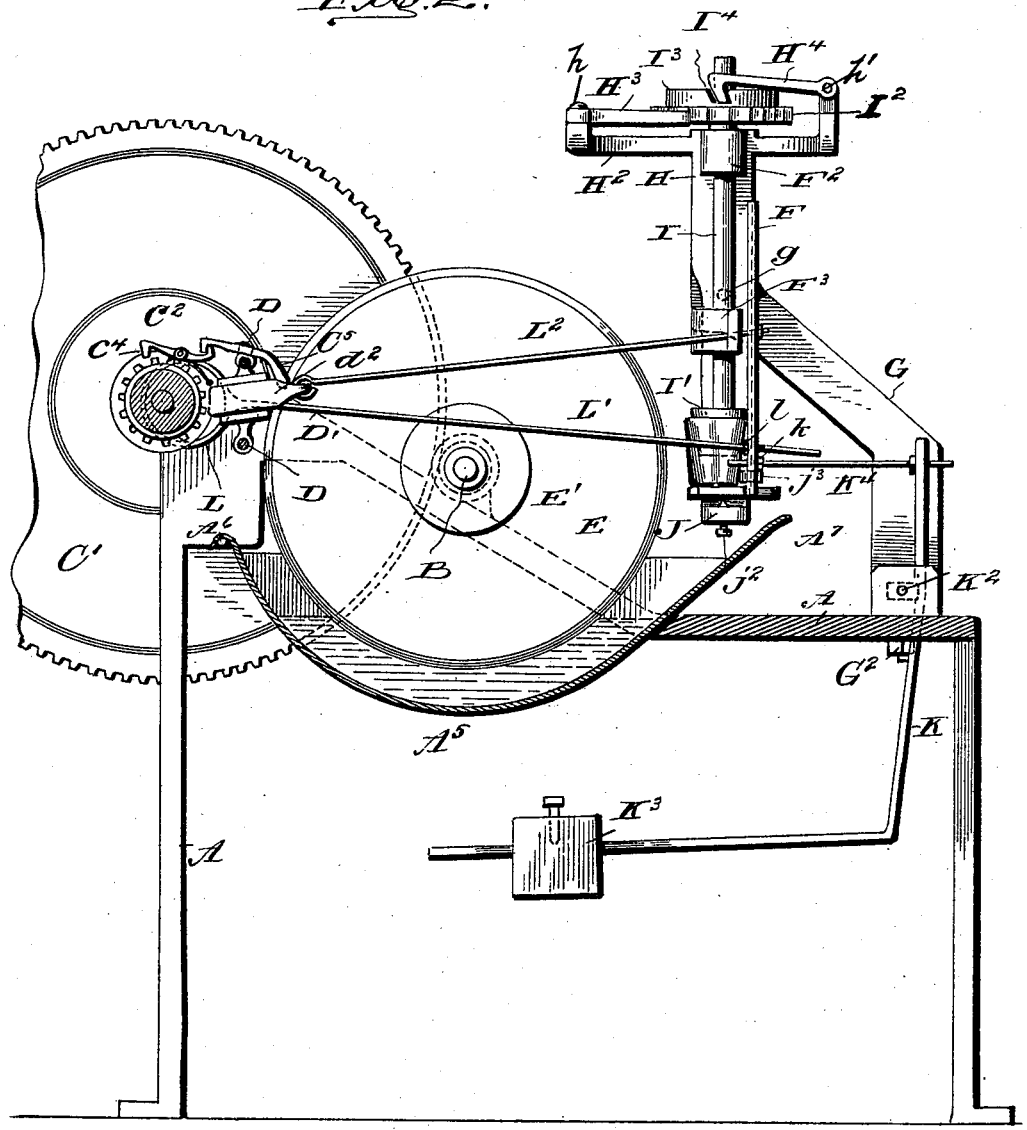

(No Model.) 3 Sheets—Sheet 3.
H. C. SCHRADER.
GLASS GRINDING MACHINE.
No. 595,974. Patented Dec. 21, 1897.
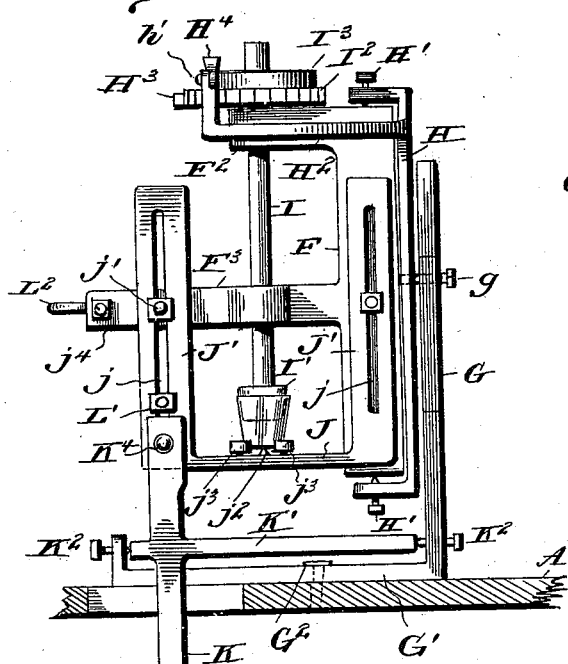
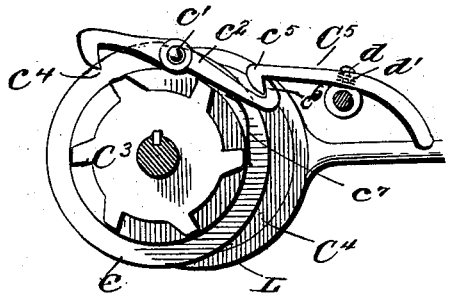
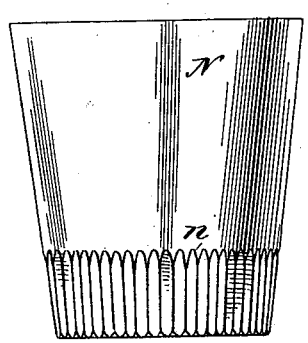
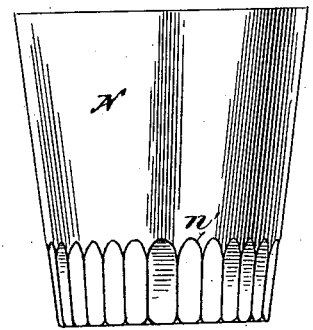
Witnesses
L. C. Hills
Alfred T. Gage
Inventor
Henry C. Schrader,
by E. B. Stocking
Attorney
THE NORRIS PETERS CO., PHOTO-LITHO., WASHINGTON, D. C.

UNITED STATES PATENT OFFICE.

HENRY C. SCHRADER, OF STAUFFER, PENNSYLVANIA.

GLASS-GRINDING MACHINE.

SPECIFICATION forming part of Letters Patent No. 595,974, dated December 21, 1897.

Application filed July 23, 1897. Serial No. 645,724. (No model.)

*To all whom it may concern:*

Be it known that I, HENRY C. SCHRADER, a citizen of the United States, residing at Stauffer, in the county of Westmoreland, State of Pennsylvania, have invented certain new and useful Improvements in Glass-Grinding Machines, of which the following is a specification, reference being had therein to the accompanying drawings.

This invention relates to machines for grinding glasses, and is more particularly adapted for grinding flutes or facets upon the outer surfaces of drinking-glasses, goblets, or other hollow vessels.

The object of the invention is to present the glass or vessel being ground so that its axis of rotation will be at an angle to the axis of the grinding-wheel, and, further, to provide means for swinging the frame by which the glass is presented to the grinding-wheel.

It has for a further object to provide novel and efficient means for presenting the glass to the wheel, means for timing or regulating the period of grinding action, means for automatically removing the glass from contact with the wheel, and means for rotating the glass to present a fresh surface for grinding action.

The invention has for a further object to increase the capacity and efficiency of the machine, so that the maximum amount of work may be accomplished, while a perfect grinding of the surface of the glass is secured.

In the drawings, Figure 1 is a plan view of a portion of the machine, parts being in section. Fig. 2 is a vertical section on the line 2 2 of Fig. 1, showing one grinding-wheel and its adjuncts. Fig. 3 is a detail side elevation of one of the glass-holding frames. Fig. 4 is a detail end elevation of the mechanism used for actuating the parts to accomplish the removal of the glass from contact with the grinding-wheel. Fig. 5 is a side elevation of a glass ground with flutes produced by the machine shown in the drawings, and Fig. 6 is a similar view of a glass having another form of flutes or facets.

Like letters of reference refer to like parts throughout the several figures of the drawings.

The letter A designates a frame or support, which is provided with extensions $A'$, provided with bearing-boxes $A^2$ for a driving-shaft B and with similar boxes $A^3$ for a shaft C. The extensions $A'$ are also formed with supporting-portions $A^4$, in which are mounted non-rotatable rods or supports D. Upon one end of the shaft B a driving-pulley $B'$ is provided, and this shaft also carries a pinion $B^2$, which meshes with and drives an enlarged gear-wheel $C'$. The shaft B also carries at intervals a series of grinding-wheels E, which are removably mounted upon the shaft by means of collars $E'$. Suitably supported in the frame beneath the grinding-wheels is a water-trough $A^5$, which is adapted to contain water to moisten the grinding-wheels during their rotation. This trough is removably supported by a hooked flange $A^6$ at one edge, and is provided with a flange $A^7$ at the opposite edge to return splashings to the trough.

Upon the frame or table A and adjacent to the periphery of the grinding-wheel there is mounted a swinging frame F, which is pivotally mounted upon the frame or table by the standard G, which has a horizontal portion $G'$, secured to the frame A by any suitable means—for instance, by a bolt $G^2$. At the upper portion of the standard G there is mounted a frame or support H, rigidly secured by means of a bolt $g$, and within this frame the glass-holding frame is supported by pivot-screws $H'$, which are mounted at the top and bottom of the frame H and adjustable to take up wear between the parts. The upper part of the frame H is provided with bifurcated arms $H^2$, one of which carries a pawl $H^3$, mounted upon a vertical pivot $h$, and the other of which carries a detent $H^4$, mounted upon a horizontal pivot $h'$, for a purpose to be hereinafter described. The glass-holding frame is provided at its upper end with a horizontal extension $F^2$ and near its middle with a similar extension $F^3$, each of which is provided with a bearing for the vertical shaft I, which rotates the glass in the frame. Upon the frame F a base or support J is mounted so as to be vertically adjustable by means of the portions $J'$, provided with slots $j$, which base is secured in its adjusted position by means of bolts and nuts $j'$, which extend through the frame F and the arm $F^3$ thereof and through the slots in the base J, so as as to secure the latter in its vertically-adjusted position. By this means the support beneath the glass or article being ground can be adjusted so as to accommodate the frame for the reception of glasses of different heights.

The glass is supported in the frame by means of an elastic or rubber holder I', which fits into the upper portion of the article ground, and beneath the glass upon the base J a centering-point $j^2$ is provided, upon which the glass is adapted to rotate, and at the side of the glass farthest from the grinding-wheel I provide rollers $j^3$, against which the glass bears to prevent its being moved when in contact with the grinding-wheel. For the purposes of rotating the vertical shaft I and the glass carried thereby as the flutes are to be ground I provide at the upper end of the shaft a ratchet-wheel $I^2$, which operates in connection with the pawl $H^3$, carried by the rigid portion H, as the frame is swung to accomplish a step-by-step movement of the shaft. Upon the upper surface of the ratchet-wheel $I^2$, I provide a collar or extension $I^3$, which has therein a recess or seat $I^4$, into which the detent $H^4$ will drop when the glass has completed a full revolution. This detent is carried by the rigid frame H and holds the horizontally-swinging frame F in its position away from the grinding-wheel.

For the purpose of normally forcing and holding the glass in contact with the grinding-wheel I provide an angle-lever K, which is pivoted upon the standard G by means of a horizontal portion K' and pivoting-screws $K^2$, bearing at the opposite ends of the portion K'. The horizontal extension of the lever K is provided with an adjustable weight $K^3$, which can be moved thereon to regulate the amount of pressure to be exerted against the glass-holding frame. The upper portion of the lever K is connected with the frame F by means of a rod $K^4$, which extends from the side of the lever and at one end is loosely mounted in the slot $j$ of the base portion J. A nut $k$, located on the rod, bears against the body of the portion J, so as to swing the same toward the wheel in the movement of the rod, and the mounting of the rod in the slot permits the necessary play thereof during the horizontal swinging of the frame F.

The parts thus far described are adapted to effect the movement of the glass toward the grinding-wheel, the rotation of the wheel for the removal of the glass, and the holding of the glass out of contact with the wheel when the final flute or facet of the series is completed and the glass has made an entire revolution.

It is obvious that the withdrawal of the swinging glass-holding frame might be accomplished by hand, but as tending to produce a more efficient machine I have provided means for automatically removing the glass from the grinding-wheel after the same have been in contact with each other for a predetermined time. To produce this automatic withdrawal of the glass from the grinding-wheel, I provide upon the rotating shaft C a series of worms or screws $C^2$, secured to the shaft to rotate therewith. At one end of the worm or screw a ratchet-wheel $C^3$ is fixed to rotate with the shaft, and adjacent to this ratchet-wheel a loosely-mounted eccentric or cam $C^4$ is secured. This cam carries an extension $c$, upon a projection $c'$ of which a pawl or detent $c^2$ is pivoted, so that its inner hooked end $c^4$ will engage the teeth of the ratchet-wheel $C^3$, and thus cause the cam to rotate with the worm and ratchet-wheel. The detent or pawl $C^2$ is normally held out of contact by means of a latch $C^5$, which is pivoted upon the rigid support D by means of a vertical pivot-pin $d$, which pin is connected with the latch by means of a retracting-spring $d'$, so that when the pawl is swung or moved to one side in a horizontal plane the spring $d'$ will return it to its initial position. This latch is provided with a hooked end $c^5$, adapted to engage a similar hooked end $c^6$ upon the detent to hold the detent out of engagement with the ratchet-wheel. When the latch is moved by means hereinafter described, the detent or pawl will be forced into engagement with the teeth of the ratchet-wheel by means of the spring $c^7$. For the purpose of operating this latch I locate upon the support D a sliding dog D', one for each latch, which dog carries upon its surface a collar $D^2$, through which moves a sliding pin $d^2$. This pin is normally held in contact with the grooves or ways on the worm by means of a spring $d^3$, and the sliding dog is connected with a fixed pin by means of a spring $d^4$, constructed and arranged to return the sliding dog to its initial position after the pin has been released from the worm. The dog is also provided with a projecting pusher $d^5$, which in the travel of the sliding dog will engage or strike one end of the latch, so as to rotate the same in a horizontal plane and release the detent, so that it will be thrown into engagement with the ratchet-wheel by a spring $c^7$. Surrounding the eccentric is an annular sleeve L, from which extends a rod L', passing through the slot $j$ in the swinging frame, and provided with a nut $l$ to bear against the frame, so as to move the latter when the eccentric rotates. The pin carried by the sliding dog is also connected with the swinging frame by means of a rod $L^2$, which passes through a lug $j^4$ on the frame and is provided with a nut $l'$, whereby when the frame is moved the pin will be withdrawn from engagement with the worm or screw.

The foregoing description relates to a single swinging frame and means for operating the same; but it is obvious, as shown in Fig. 1, that a series of frames and grinding-wheels may be arranged and operated by the same driving mechanism. In such an instance the structure of the parts just described is duplicated for each grinding device which it may be desired to employ.

The operation of the mechanism just described is as follows: The shaft B, being driven by the driving-pulley B', rotates the grinding-wheels E and by means of the meshing gears the shaft C, which carries the worms or screws, the ratchet-wheels, and the eccentrics or cams at the beginning of the grinding operation. The glass to be ground is placed in the swinging frame by lifting the spindle I so that the holder I' will fit within the glass to support it in position. At the same time the sliding pin carried by the dog is in engagement with the grooves of the worm at one end thereof and the swinging frame forced toward the grinding-wheels, while the glass carried thereby is held in contact with the wheel by means of the weighted lever K and its adjuncts. The cam at this time is loose upon the shaft and does not rotate, although the worm and ratchet-wheel are rotating adjacent thereto. In the rotation of the worm the sliding dog will be fed or moved toward the latch $C^5$ until the projecting finger $d^5$ thereon engages one end of the latch, thus swinging the same horizontally upon its pivot to release the detent carried by the cam, which then engages the ratchet-wheel, so that the cam will be rotated thereby. This rotation of the cam imparts movement through the rod L' and automatically swings the glass-holding frame away from the grinding-wheel, and at the same time the sliding pin $D^2$ is withdrawn from the worm by means of the rod $L^2$, which is moved by the swinging frame, so that the spring $D^4$ immediately retracts the sliding dog to its initial position and the spring $D^3$ throws the pin into contact with the worm for further operation. As soon as the projecting finger $d^5$ is released from the latch the same is retracted by the spring $d'$ and engages the detent in the next rotation of the cam, so as to lift the detent from the ratchet-wheel, and thus discontinue the rotation of the eccentric or cam. As the frame is swung away from the wheel the glass will be rotated to present a new surface to the grinding-wheel by means of the ratchet-wheel $I^2$ and stationary pawl $H^3$, which operate the glass-holding spindle. The operation thus far described proceeds successively until a series of flutes or facets are formed upon the periphery of the glass, and when the glass has completed an entire revolution the detent $H^4$ will drop into the socket $I^4$, provided upon the upper surface of the ratchet-feed, and thus hold the swinging frame out of contact with the grinding-wheel until said detent is lifted, when the operation just described will again be performed upon another glass, which may be inserted into the glass-holder while the frame is held away from the grinding-wheel.

The number of teeth upon the ratchet-wheel $I^2$ will determine the number of flutes upon the surface of the glass to be ground, while the configuration of the periphery of the grinding-wheel will determine the sectional formation of the flutes. For instance, in Fig. 5 there is illustrated a glass N, having a number of narrow flutes or facets $n$, while in Fig. 6 the glass N has a smaller number of flutes $n'$, which are of greater width than the flutes shown in Fig. 5. This latter configuration of the flutes may be produced by providing the grinding-wheel with a wider grinding-periphery and adjusting to the device a ratchet-wheel feed having a less number of teeth than the wheel used in connection with the flute shown in Fig. 5. It is obvious that numerous configurations of the flutes or facets may be produced by the use of different forms of grinding-wheels and feeding devices for rotating the glass.

I have described with particularity the details of construction of the several parts of this machine, but it will be obvious that numerous changes may be made therein without departing from the spirit of the invention.

Having described my invention and set forth its merits, what I claim, and desire to secure by Letters Patent, is—

1. In a glass-grinding machine, the combination with a power-shaft and grinding-wheel driven thereby, of a glass-holding frame pivotally mounted at an angle to the axis of said power-shaft, an auxiliary shaft provided with normally inoperative means for intermittently swinging said glass-holding frame away from said grinding-wheel, a connecting device between said means and the swinging frame, a traveling device positively connected with said auxiliary shaft to intermittently throw into operation the frame-swinging means, means to automatically return said device to its initial position, means for automatically moving said frame toward the grinding-wheel, and means for producing a step-by-step rotation of an article held in said swinging frame, substantially as specified.

2. In a grinding-machine, the combination with a power-shaft and grinding-wheel driven thereby, of a shaft parallel with said driving-shaft and provided with a worm or screw, an eccentric loosely mounted upon said parallel shaft, means for actuating said eccentric, a sliding device operated by said worm to effect the engagement of the eccentric-actuating means, a swinging glass-holding frame pivoted at an angle to said shafts, connecting devices between said eccentric and swinging frame, a connecting device between said sliding device and the swinging frame to disengage the sliding device from the worm when the frame is swung in one direction, and means for automatically swinging said frame toward the grinding-wheel, substantially as specified.

3. In a glass-grinding machine, the combination with the grinding-wheel, of a swinging frame, a glass-holding spindle rotatably mounted in said frame, stops carried by said frame at its side opposite to the grinding-wheel to prevent a lateral movement of the glass, and means for intermittently rotating said glass-holding spindle, substantially as specified.

4. In a glass-grinding machine, the combination with the grinding-wheel, of a stationary standard provided with oppositely-located arms, a swinging frame between said arms, a glass-holding spindle rotatably mounted in said frame, a ratchet-wheel located upon said spindle, a collar having a recess or seat carried by said spindle adjacent to said ratchet-wheel, a feed-pawl mounted upon one arm of said standard and adapted to rotate said ratchet-wheel when the frame is moved in relation to said arms, and a detent pivoted upon the opposite arm of said standard in a different plane from the ratchet-wheel and adapted to engage the recess in said collar; substantially as specified.

5. In a glass-grinding machine, the combination with a grinding-wheel, of a stationary standard provided with bifurcated arms, a swinging frame vertically pivoted between said arms, a rotatable glass-holding spindle mounted in said frame, a ratchet-wheel located upon said spindle, a collar projecting from said ratchet-wheel at an angle to the teeth thereof and provided with a recess therein, a vertically-pivoted pawl carried by one of said arms in alinement with the teeth of said ratchet-wheel, and a horizontally-pivoted detent upon the opposite arm adapted to travel upon the surface of said collar and to engage said recess; substantially as specified.

6. In a glass-grinding machine, the combination with a grinding-wheel, of a pivoted frame, means for supporting and rotating a glass therein, an adjustable base for said frame, provided with a seat and having upwardly-extending arms, and means to adjustably secure said arms to said frame; substantially as specified.

7. In a glass-grinding machine, the combination with a grinding-wheel, of a pivoted frame, means for supporting and rotating a glass therein, an adjustable base for said frame provided with slotted vertical extensions, and clamping-nuts passing through the frame to secure said base at its adjusted position, substantially as specified.

8. In a glass-grinding machine, the combination with a grinding-wheel, of a pivoted frame, means for supporting and rotating a glass therein, a pivotally-mounted weighted lever and a connection between said frame and lever to permit movement of the former independently of the latter, substantially as specified.

9. In a glass-grinding machine, the combination with a grinding-wheel, of a swinging glass-holding frame, a rotating shaft carried thereon, a worm, a ratchet-wheel, an eccentric loosely mounted upon said shaft and provided with extension upon which a pivoted pawl adapted to engage said ratchet-wheel is mounted, a latch supported upon a stationary member and adapted to normally hold said pawl out of contact with said ratchet-wheel, a sliding dog adapted to be fed by said worm and to release said latch, and means connecting said eccentric and sliding dog with the swinging frame, substantially as specified.

10. In a glass-grinding machine, the combination with a grinding-wheel, of a swinging glass-holding frame, a rotating shaft carried thereon, a worm, a ratchet-wheel, an eccentric loosely mounted upon said shaft and provided with an extension upon which a pivoted pawl adapted to engage said ratchet-wheel is mounted, a latch supported upon a stationary member and adapted to normally hold said pawl out of contact with said ratchet-wheel, a sliding dog provided with a sleeve, a spring extending from a stationary support to retract said dog to its initial position, a sliding pin located in said sleeve and provided with a retracting-spring to throw said pin into engagement with said worm, and means connecting said eccentric and sliding dog with the swinging frame, substantially as specified.

In testimony whereof I affix my signature in presence of two witnesses.

HENRY C. SCHRADER.

Witnesses:
GEO. H. RUPERT,
JNO. D. McCALEB.